United States Patent
Orbach et al.

[19]

[11] Patent Number: 6,016,875

[45] Date of Patent: Jan. 25, 2000

[54] GAIN ADAPTATION CONTROL FOR HYDRAULIC SYSTEMS

[75] Inventors: Abraham Orbach, Naperville; William L. Schubert, Downers Grove; Steven W. Seymour, Plainfield, all of Ill.; Donald D. Carr, Valley City, N. Dak.

[73] Assignee: Case Corporation, Racine, Wis.

[21] Appl. No.: 09/021,433

[22] Filed: Feb. 10, 1998

[51] Int. Cl.$^7$ .................................................. A01B 41/06
[52] U.S. Cl. .................................................. 172/2; 701/50
[58] Field of Search ................................ 172/3, 4, 4.5, 7, 172/9, 2, 439; 37/348; 701/50

[56] References Cited

U.S. PATENT DOCUMENTS

| | | |
|---|---|---|
| 4,508,176 | 4/1985 | Wiegardt et al. ............................ 172/7 |
| 4,518,044 | 5/1985 | Wiegardt et al. ............................ 172/7 |
| 4,969,527 | 11/1990 | Boe et al. .................................... 172/7 |
| 4,979,092 | 12/1990 | Bergene et al. ......................... 172/3 X |
| 5,320,186 | 6/1994 | Strosser et al. . |
| 5,421,416 | 6/1995 | Orbach et al. . |
| 5,472,056 | 12/1995 | Orbach . |
| 5,550,733 | 8/1996 | Yun et al. ....................... 364/424.07 X |
| 5,622,226 | 4/1997 | Hausman et al. . |
| 5,884,204 | 3/1999 | Orbach et al. ........................... 172/2 X |

*Primary Examiner*—Victor Batson
*Attorney, Agent, or Firm*—Mayer, Brown & Platt

[57] ABSTRACT

A system or method for controlling the position of an implement coupled to a work vehicle. The implement is moveable by a hydraulic positioning assembly including an actuator and a valve assembly which control the flow of fluid to the actuator in response to control signals. The valve assembly includes raise and lower valves, each valve requiring a control signal equal to a threshold value before the valve opens and fluid begins to flow. The system includes a sensor to detect the position of the implement and a control circuit. In response to a change in a position command, the control circuit applies a control signal to the appropriate raise or lower valve based upon the respective threshold value. The control signal is generated by using a predetermined gain. When undesirable implement movement such as an overshoot condition is detected, the control circuit modifies the gain value. The modified gain value is used to generate subsequent control signals for actuating the implement.

18 Claims, 6 Drawing Sheets

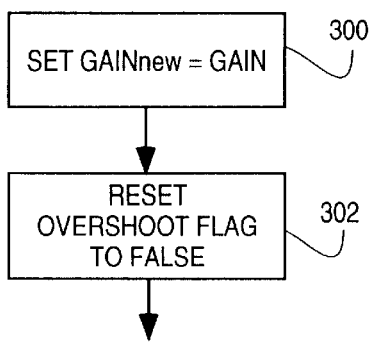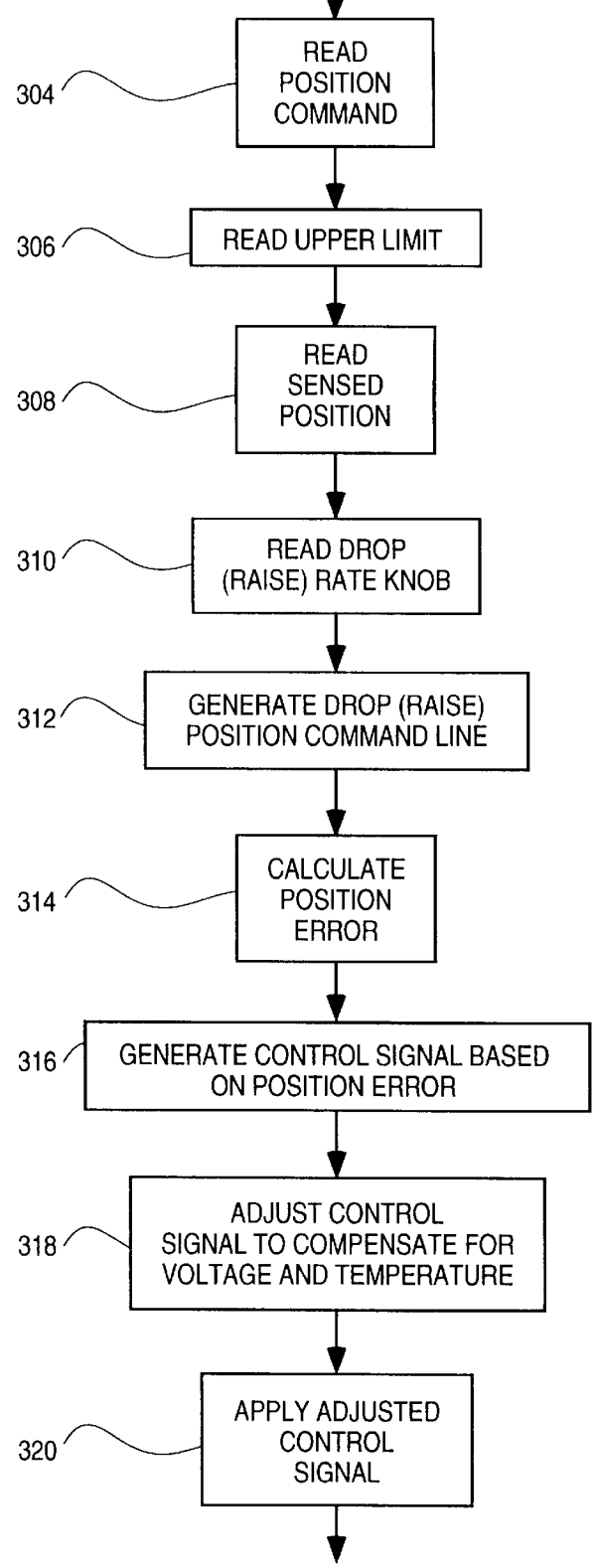

GAIN ADAPTATION CONTROL FOR HYDRAULIC SYSTEMS

FIELD OF THE INVENTION

The present invention generally relates to the field of control systems for work vehicles. More particularly, the invention relates to a system and a method for controlling the gain for generating a control signal for a valve assembly controlling the flow of fluid to a hydraulic actuator, wherein the system applies a modified gain in subsequent valve operation to cancel undesirable movements.

BACKGROUND OF THE INVENTION

A number of known control arrangements regulate the position or elevation of implements, such as plows, attached to or drawn by agricultural vehicles, such as tractors. Such control systems generally sense the position of a three-point hitch or other implement support structure and compare this position to a command value set by an operator using a command device. Based upon this comparison, such control systems generate control signals applied to valves which control the flow of hydraulic fluid to and from an actuator configured to vertically move the hitch, along with the implement mounted on it, to the desired elevation.

The hydraulic valves, which may include a raise valve and a lower valve or a three-position directional control valve, are typically solenoid-operated valves which include electrical coils. The coils operate the valves in response to electrical control signals generated by a control system. The control signals may include pulse-width-modulated (PWM) signals applied to drivers such that the rate of movement of the actuator is proportional to the duty cycle of the control signals. Typically, however, the control signal applied to each valve includes a threshold component designed to overcome inherent deadband in the valve and fluid flow forces within the valve, such as forces created by friction or springs, in order to open the valve and allow fluid to begin to flow through the valve. Thus, the control signal applied to the valve includes both a threshold component to open the valve and a component representing the desired drop or raise rate of the valve. The control signal is calculated by modifying a desired drop or raise signal by a gain value.

Known control systems, however, may experience problems which cause the implement to drop or raise in an undesirable manner to a position which is lower or higher than the desired position due to the gain value. This momentary jerk is disruptive to the operator and can unnecessarily shake the implement.

One such problem occurs because of valve hysteresis and the effect of implement weight on the movement rate. For example, a heavy implement may be commanded to elevate at a slow rate. To start the implement movement, a control signal including both a threshold component and a desired raise rate is applied to the raise valve. However, once the raise valve opens and the implement begins to move, the rate of elevation may be less than the desired elevation rate because the rate depends upon the weight of the implement. The system may overcompensate undesired rate gap by a gain value which results in a greater than expected elevation of the implement, causing a jerk felt by the vehicle operator.

Accordingly, a need exists for a implement lift system which adjusts the gain of the raise control signal to eliminate unwanted motion in the implement. Furthermore, there exists a need for a system which will adapt the gain of the control signal for future operations of the lift system to eliminate unwanted motion in the implement during the lifting and lowering operations.

SUMMARY OF THE INVENTION

In accordance with one aspect, the invention relates to a system for controlling the position of an implement coupled to a work vehicle. The implement is raised by a hydraulic positioning assembly with an actuator and a valve assembly configured to control the flow of fluid to and from the actuator in response to control signals. The system has a sensor configured to detect the position of the implement and to generate a signal representative thereof. The system also has a position command device for setting a desired position of the implement. The system has a control circuit coupled to the sensor and the valve assembly. The control circuit is configured to generate control signals applied to the valve assembly using a predetermined gain. After detecting undesirable movement of the implement, the controller modifies the gain and generates subsequent control signals based upon the modified gain value.

The present invention is further embodied in a method for controlling the position of an implement coupled to a work vehicle. The implement being moveable by a hydraulic positioning assembly having an actuator and a valve assembly configured to control the flow of fluid to and from the actuator in response to control signals. A control signal is generated and applied to the valve assembly based on a desired actuator position and a gain value. Undesirable implement movement is then detected. The gain value is then modified. Finally, the modified gain value is used to generate subsequent control signals.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

The invention will become more fully understood from the following detailed description, taken in conjunction with the accompanying drawings, wherein like reference numerals refer to like parts, in which:

FIGS. 3A & 3B are a flow chart generally representing typical control logic used to control the position of the implement in response to a position command signal.

DETAILED DESCRIPTION OF THE PREFERRED EMBODIMENT

Before proceeding to the Detailed Description of the Preferred Embodiments, several general comments can be made about the applicability and the scope of the invention. First, while reference is made throughout the following discussion to a tractor having a hitch assembly on which an implement is mounted, it should be understood that the present system is applicable to control systems for work vehicles in general. Thus, a system employing the elements recited in the appended claims, though used with other types of vehicles and/or for performing other functions, is equally within the intended scope of the invention.

Figure 1A:
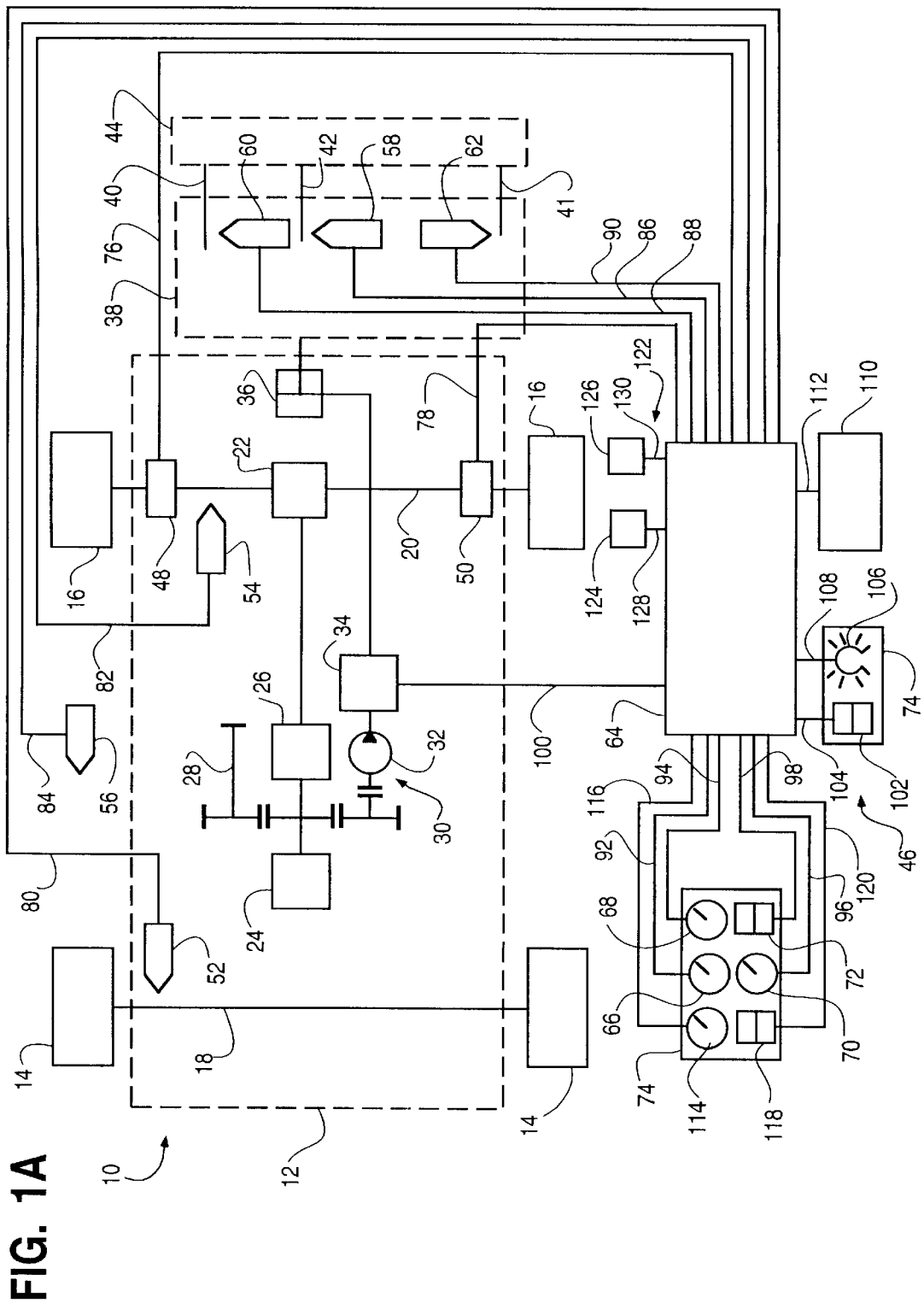
FIG. 1A is a diagrammatical representation of a tractor equipped with a control system for positioning an implement in response to a plurality of operating parameters including implement position and load.

Turning now to the FIGURES and referring first to FIG. 1A, a vehicle 10, such as an agricultural tractor, is illustrated diagrammatically as including a body 12 carried by front wheels 14 and rear wheels 16. Front wheels 14 are mounted in a conventional manner on an axle 18 and rear wheels 16 are mounted on a rear axle 20 coupled to a differential 22. Vehicle 10 also includes a power plant or engine 24 coupled through a transmission 26 to differential 22 such that engine 24 may selectively drive rear wheels 16 in a number of forward and reverse gears. Vehicle 10 typically includes auxiliary systems coupled to engine 24, such as a power take off shaft 28 for driving implements and other detachable equipment. A tractor generally of this type is further described in U.S. Pat. No. 5,421,416 incorporated herein by reference.

Figure 1B:
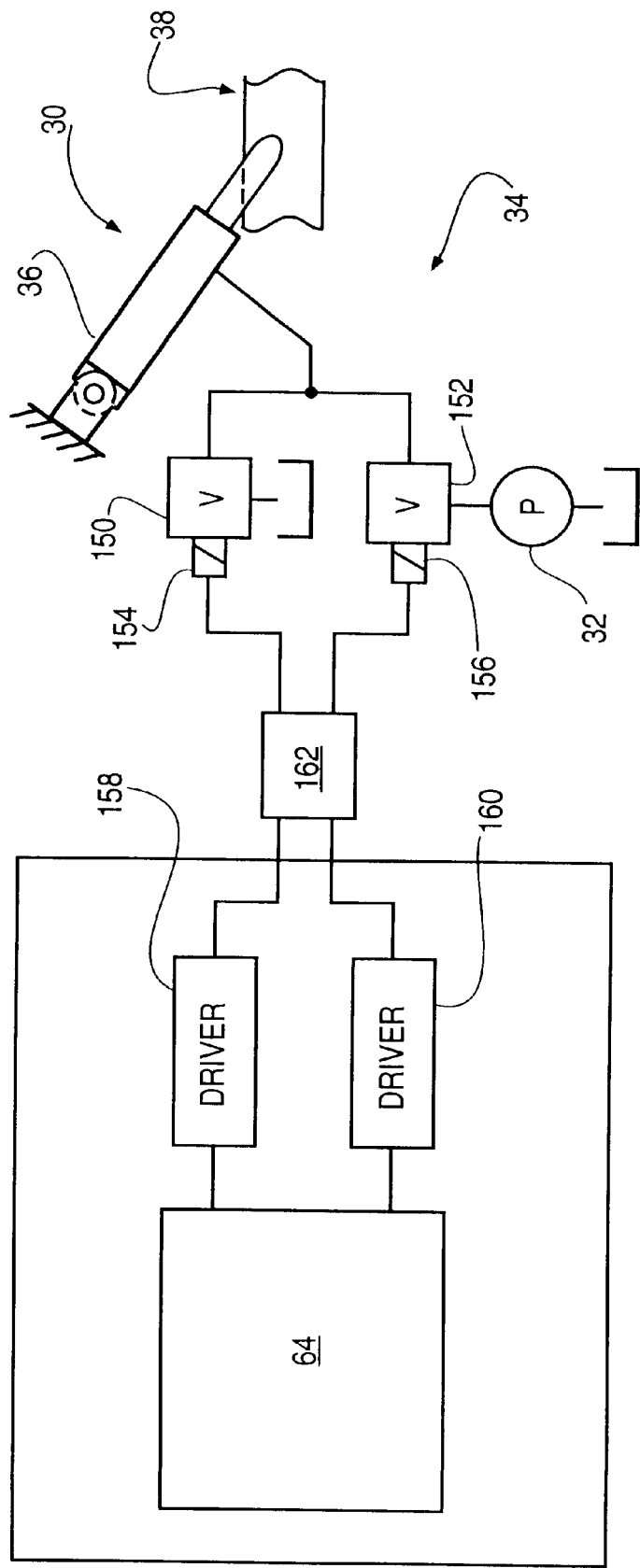
FIG. 1B is a diagrammatical representation of the hydraulic system shown generally in FIG. 1A.

A hydraulic system 30 is coupled to engine 24 to provide a source of pressurized fluid for powering various actuators. As illustrated in FIG. 1B, hydraulic system 30 includes a hydraulic pump 32 piped to a fluid reservoir (not shown) and to a valve assembly 34 for regulating and directing pressurized fluid to various hydraulic components, such as a linear actuator, single acting or double-acting cylinder 36 coupled to a hitch assembly 38. Hitch assembly 38 may be a conventional three-point hitch having lower and upper hitch links 40 and 42 for supporting a working implement 44, such as, for example, a plow. Moreover, valve assembly 34 preferably includes solenoid operated proportional valves (not shown) for directing a flow of pressurized fluid to actuator 36 for raising and lowering hitch assembly 38 and implement 44 as commanded by an operator or control system as described below, such as to vary the penetration of implement 44 into ground being worked. Valve assembly 34 can also be used to raise hitch assembly 38, along with implement 44, to a lifted position wherein the implement is not engaged in a working position with the ground. A lifted position may typically be commanded by the operator or control system during travel of tractor 10 across a road or between fields.

As illustrated in FIG. 1A, vehicle 10 is equipped with a control system, designated generally by the reference numeral 46 for controlling the position of hitch assembly 38 and implement 44. While control system 46 may include more or fewer of the elements shown in FIG. 1A, it may typically include brake sensors 48 and 50 coupled to the rear service brakes of vehicle 10, speed sensors 52 and 54 coupled to the front and rear axles 18 and 20, respectively, a true ground speed sensor 56 (e.g., a radar-based speed sensor or non-powered wheel speed sensor in a 2-wheel drive tractor), a hitch position sensor 58 and draft load force sensors 60 and 62. Control system 46 also includes a control circuit 64 and command devices 66, 68, 70, 72, 102, 114 and 118 (described below) which may be provided on a single or multiple control consoles 74 in the tractor cab. Control system 46 also includes one or more devices to display status or parameter information to the operator, such as a lamp 106 and a display 110 (described below).

In operation, brake sensors 48 and 50 detect the application of the tractor service brakes and generate braking signals upon application of the brakes. These braking signals are applied to control circuit 64 via conductors 76 and 78, respectively. Of course, for control systems employing control routines that do not make use of braking signals, sensors 48 and 50 may be omitted. Speed sensors 52 and 54, which may include a variable inductance magnetic pickup sensor, detect the rotational velocity of front wheels 14 and rear wheels 16 respectively, and generate signals representative thereof. These speed signals are transmitted to control circuit 64 via conductors 80 and 82. A vehicle 10 may also include a ground speed sensor 56 to measure the true speed of vehicle 10 with respect to the ground. Sensor 56 typically includes a radar device mounted to body 12 of vehicle 10 which emits radar signals toward the ground and receives a portion of the signals rebounding from the ground to determine the ground speed. Sensor 56 then generates a speed signal representative of the vehicle speed and transmits this signal to control circuit 64 via conductor 84. Alternatively, ground speed sensor 56 could include a receiver for receiving sequential signals from a satellite positioning system such as the Global Positioning System (GPS), with the ground speed equal to the change between sequential positions divided by the elapsed time. Speed sensor 52 could also be used to measure ground speed since it senses the rate of rotation of a non-driven front wheel 14 of vehicle 10.

The signals produced by sensors 48 through 56 are used as inputs by control circuit 64 to regulate various functions of tractor 10 in accordance with preset, cyclical control routines. For instance, braking signals from sensors 48 and 50 may be used to control engagement and disengagement of a locking circuit (not shown) for differential 22. Speed signals from sensors 52, 54 and 56 may be used to calculate a driven wheel slip value for use in controlling implement position. Moreover, other, additional sensors may be provided on vehicle 10 for use in additional control routines. For example, such sensors could provide signals indicative of engine speed for use in regulating engine throttling or implement position as desired. Moreover, it should be understood that the various control functions required for operation of vehicle 10, including the implement control functions discussed below, may be executed by a single control circuit 64 or by separate, dedicated control circuits taking as inputs only the parameter signals necessary for their precise function.

Control of the position of implement 44 is generally based upon information relating to the sensed implement position and draft load force. This information is provided via position sensor 58 and draft load sensors 60 and 62. Thus, position sensor 58, which is typically a rotary or linear potentiometer or linear variable differential transformer (LVDT) coupled to a linkage 42 of the vehicle hitch assembly 38, detects the position or elevation of implement 44 with respect to body 12 and generates a position signal representative thereof. This position signal is conveyed to control circuit 64 via a conductor 86. Draft load sensors 60 and 62, which typically include resistance strain gauges applied to links 40 and 41 of hitch assembly 38, generate draft load signals representative of the force exerted on the links. These draft load signals are transmitted to control circuit 64 via conductors 88 and 90, respectively. Thus, control circuit 64 receives signals representative of both the position of implement 44 and either the draft force generated by interaction of implement 44 with the ground or, when implement 44 is in a lifted position, the load exerted by implement 44 on links 40 and 41. When vehicle 10 is stopped and implement 44 is in a lifted position, the load sensed by sensors 60 and 62 is related to the weight of the implement.

In addition to sensed values of the operating parameters discussed above, control circuit 64 receives command or reference values from command devices 66, 68, 70, 72, 114 and 118, which typically include switches and potentiometers positionable via suitable knobs or handles (not shown). For the purposes of implement position control, command device 66 provides an implement position command signal representative of the desired position of implement 44. Command device 66 is operator adjustable and may be used to directly control the position of implement 44. Command device 68 provides a draft command value representative of the desired level of draft force on implement 44. Command device 70 is an operator adjustable upper limit selector for setting the maximum allowable raised physical position of hitch assembly 38, hereinafter referred to as the upper limit, beyond which control system 46 may not move assembly 38. Command device 72 is an implement position override switch that includes an UP position, a DOWN position and a spring biased momentary DOWN position accessible from the DOWN position. Command device 114 is an operator-adjustable raise rate device for setting a desired raise rate of actuator 36. Finally, command device 118 is an optional drop rate override switch that includes a first position in which control circuit 64 uses the raise rate set by command device 114, and a second position in which the raise rate may be overridden.

Although the foregoing command devices are preferred, a given control system may not use every command device described above, and other command devices may provide other inputs for control of various functions of tractor 10. For example, control system 46 may also include an operator-adjustable drop rate command device for setting a desired drop rate of actuator 36 independently of raise rate command device 114. The drop rate set by this command device 114 could also be overridden by an optional override switch. The raise rate and drop rate command devices may be referred to as rate of movement devices. Control system 46 may also include a travel knob or response rate knob as described in U.S. Pat. No. 5,421,416, mentioned above.

Signals from devices 66, 68, 70, 72, 114 and 118 are applied to control circuit 64 via conductors 92, 94, 96, 98, 116 and 120, respectively. Based upon the command or reference values supplied by command devices 66, 68, 70, 72, 114 and 118, and upon the sensed values from sensors 48 through 62, control circuit 64 generates control signals for raising and lowering implement 44 and applies these control signals to valve assembly 34 via conductor 100 to move actuator 36.

In a control system equipped for slip control, control circuit 64 also receives a command from command device 102. Command device 102 is used for turning a slip control function on and off and for setting a slip limit. Command device 102 is preferably a three-position rocker switch selectively movable between OFF, ON and SET positions. The SET position of command device 102 is accessible from the ON position and is a momentary position maintained as long as the operator holds command device 102 in the SET position. A signal indicative of the position of command device 102 is applied to control circuit 64 via conductor 104. The slip control system also includes a slip indicator lamp 106. Lamp 106 is activated by a signal supplied by control circuit 64 via conductor 108 when a slip control override function is engaged to raise hitch assembly 38 to reduce wheel slip to a desired range.

Control system 46 may also include a display 110 controlled by control circuit 64 via conductor 112. Display 110 may be adapted to display various parameters in a manner known in the art and may include video monitor, LCD display, LED display and the like.

Control system 46 also includes a remote switch assembly 122 for commanding elevational movements of hitch assembly 38. Remote switch assembly 122 preferably includes a pair of remote momentary switches 124 and 126 mounted on the vehicle 10, such as fender-mounted near the rear of vehicle 10. Remote switches 124 and 126 are momentary UP and DOWN switches coupled to control circuit 64 via conductors 128 and 130, respectively. Switches 124 and 126 could be replaced with an appropriate single switch.

While in the foregoing description of control system 46 the various sensors and command devices are shown coupled directly to circuit 64, other system structures and architectures may be used. For example, control circuit 64 may be one of several peer, master or slave controllers provided on vehicle 10 for different subsystems, such as PTO operation, an operator's console, transmission operation and the like. In such cases, control circuit 64 may be coupled to other controllers via a communications databus and some or all of the sensors and command devices needed to carry out the functions of control circuit 64 may be assigned and interfaced directly with other controllers on the vehicle. The various parameter signals needed by control circuit 64 could be communicated to control circuit 64 via the communications databus and circuit 64 would include communications interface circuitry adapted to recognize and record necessary signals from the databus. Moreover, circuit 64 may be adapted to output control signals via the communications databus to be received by other system controllers such that the control functions are executed by such other system controllers.

Hydraulic system 30 is shown in detail in FIG. 1B. Cylinder 36 is operated in response to the operation of hydraulic valves 150 and 152 which control the flow of fluid to and from cylinder 36. Valve 150 is referred to as the raise valve and valve 152 is referred to as the lower valve. Alternatively, valves 150 and 152 can be embodied into a single valve. Valves 150 and 152 are preferably designed as solenoid-operated valves and each includes an electrical coil 154 and 156, respectively, which operate the respective valve in response to control signals generated by control circuit 64. Thus, coils 154 and 156 may be referred to as raise coil 154 and lower coil 156. However, other forms of electrically-driven mechanisms could be used to position implement 44 as shown in FIG. 1A. Control circuit 64 provides control signals to a pair of valve drivers 158 and 160. Valve drivers 158 and 160 are connected to and control operation of valves 150 and 152, respectively, through a conventional relay 162. Preferably, each valve driver 158 and 160 is a conventional PWM current driver but other forms of drivers are known and could be used to operate valves 150 and 152 in the intended manner.

Figure 2:
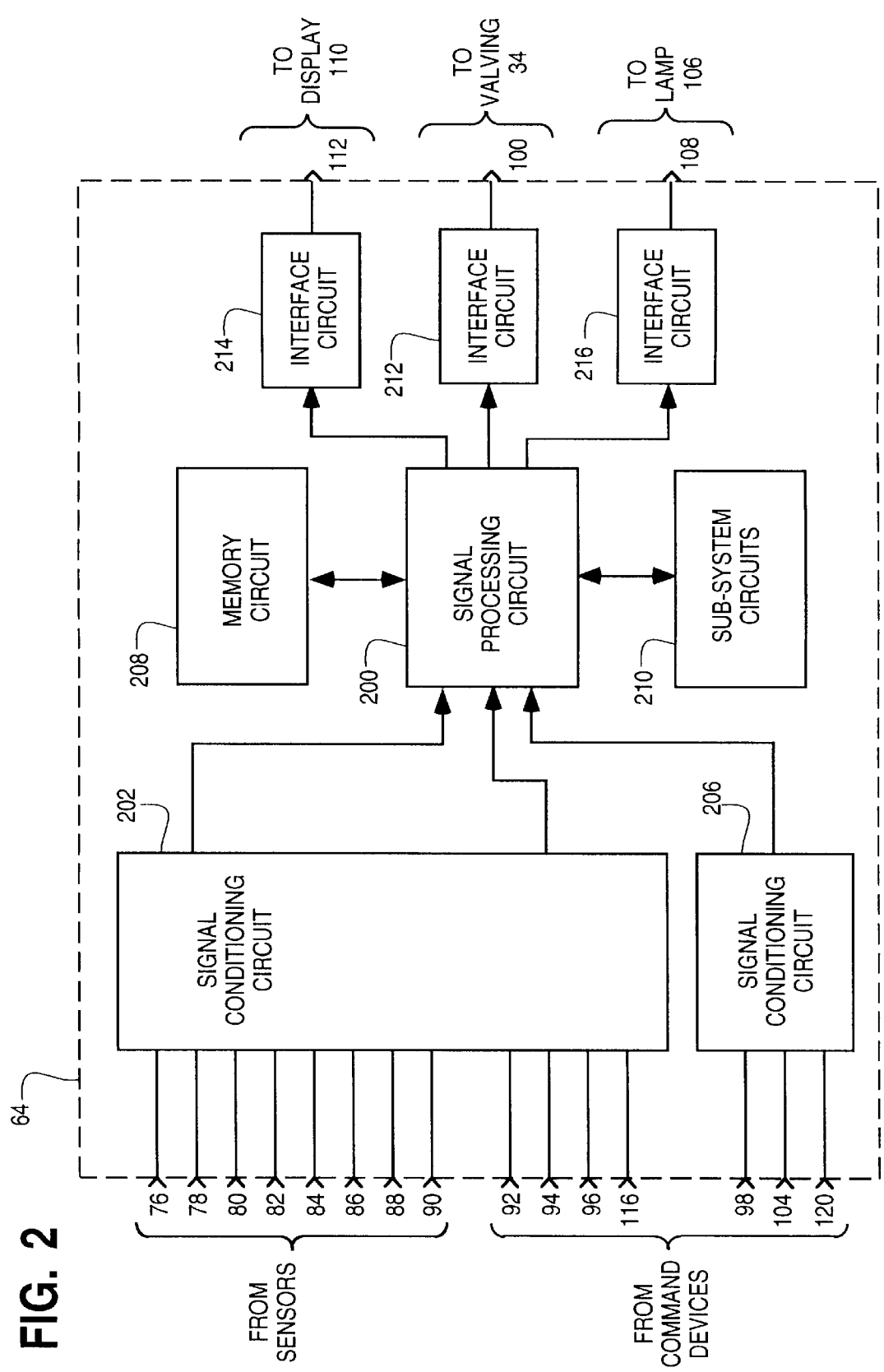
FIG. 2 is a block diagram illustrating certain of the principal circuits included in the controller for the system shown in FIGS. 1A and 1B.

Certain of the sub-circuits included in control circuit 64 are illustrated diagrammatically in FIG. 2. Control circuit 64 includes a signal processing circuit 200 coupled to a number of other circuits including signal conditioning circuits 202 and 206, a memory circuit 208, one or more subsystem circuits 210 including circuits such as a response signal generating circuit or an initialization circuit, and output signal interface circuits 212, 214 and 216. While these various circuits are illustrated in FIG. 2 as separate, interconnected elements, it should be understood that all or some of these circuits may be included in a single integrated circuit and may comprise internal circuitry of an appropriately configured or programmed microprocessor.

Input signals transmitted from sensors and command devices to control circuit 64 via conductors 76 through 96 and 116 are applied to signal processing circuit 200 through signal conditioning circuit 202, which typically includes an analog-to-digital converter circuit and appropriate isolation, depending upon the type of sensors and command devices utilized and the nature of the signals produced. More than one analog-to digital converter may be used to increase the conversion bandwidth. Circuit 202 receives the input signals from the sensors and command devices, produces digital signals or values representative of the various input signals and applies these values to signal processing circuit 200. Circuit 206 receives command input signals from other command devices via conductors 98, 104 and 120, which are generally discrete (e.g., on/off) signals for controlling operation of signal processing circuit 200. Circuit 206 typically includes a multiplexer and appropriate isolation, permitting signal processing circuit 200 to select and access signals applied to circuit 206.

Memory circuit 208, which may include several different memory modules, preferably includes both volatile and non-volatile memory, such as random access memory (RAM), electronically programmable read only memory (EPROM), electronically erasable programmable read only memory (EEPROM) and FLASH memory. The volatile memory of circuit 208 is generally used to store various parameter and intermediate values used during the control functions of signal processing circuit 200. Non-volatile memory, such as FLASH memory or EPROM, serves to store the cyclic control routine implemented by signal processing circuit 200, while other non-volatile memory, such as EEPROM, serves to store the calibration values and failure signals indicative of failure or nonresponsiveness of system components.

Other subsystem circuits 210, such as a response signal generating circuit or an initialization circuit, may be included in the circuitry of signal processing circuit 200, but are illustrated separately here for explanatory purposes. The response signal generating circuit receives values representative of sensed implement position and sensed implement draft or load and generates a response signal to control the movement of implement 44. The response signal is applied to signal processing circuit 200 to adjust control signals generated by circuit 200. The adjusted control signals, in the form of PWM output signals, are applied to output signal interface circuit 212. Circuit 212 includes appropriate valve drivers, such as drivers 158 and 160 (see FIG. 1B), for energizing the solenoids of valve assembly 34, thereby moving actuator 36 in a desired direction and at a desired rate. The rate of movement of actuator 36 is preferably proportional to the duty cycle of the control signals.

The adjusted control signals produced by circuit 200 could have forms other than PWM signals and, where actuators other than hydraulic cylinders and the like are used for moving the implement, these control signals are adapted for the particular actuator used. Circuit 200 also produces a control signal applied to interface circuit 216 which generates an output signal coupled to lamp 106 via conductor 108 to provide on/off control of lamp 106. In addition, circuit 200 produces a control signal applied to interface 214 which drives display 110 via conductor 112.

Generally, automatic control of the position or elevation of implement 44 is carried out as follows. Control circuit 64 monitors the command or reference values for implement position and draft force set by command devices 66 and 68, respectively. These values are filtered and compared to sensed position and draft force values read from sensors 58, 60 and 62 according to a cyclic control routine. A number of such routines, following a variety of control schemes, are known in the art and do not, in themselves, form part of the present invention. While different manufacturers may utilize different control routines, depending upon the type and class of vehicle being controlled and upon the parameters governing implement movement, these routines typically generate control signals for moving the implement up or down depending upon the deviation of the sensed values of at least the draft force and implement position from the reference values for these parameters. Moreover, these routines may select the greater of two or more parameter error values or combine two or more parameter error values to generate the implement control signals. Most known systems of this type ultimately generate control signals in the form of PWM signals, the duty cycle of which is proportional to the error signal forming the basis for control. These PWM signals are then applied, through an appropriate valve driver, to the solenoid coil of a proportional hydraulic valve to raise or lower the implement at a rate proportional to the PWM control signal duty cycle. A control system which executes a control routine such as the above is described in U.S. Pat. No. 5,421,416, incorporated herein by reference.

FIGS. 3A and 3B generally represent the position control logic used to control the position of implement 44. FIG. 3A shows the initialization routing performed prior to actuating implement 44. At step 300, the value, $\text{gain}_{new}$, is set to the preset gain. This value will be used as will be explained to modify the gain in accordance with the present invention. In step 302, a gain modification flag is reset to FALSE. The gain modification flag is used to insure that the gain is only modified once during the elevation operation.

FIG. 3B shows the conrol routine implemented when an operator wishes to move implement 44. At steps 304 through 310, control circuit 64 reads input values associated with the position control logic. These values include a position command from command device 66, an upper limit value from command device 70, a sensed position from position sensor 58 and a raise rate value which is a constant value. The position command and upper limit values set travel limits for the position of implement 44. At step 312, control circuit 64 generates a position command line with a slope based upon the raise rate value.

Alternatively, the raise rate may be set by the operator using a command device such as command device 114. If the user selects the raise rate, control circuit 64 digitizes the analog raise rate output from the command device and categorizes the value into one of several raise rate ranges.

At step 314, a position error value is calculated based upon the difference between the sensed position and the position command line. At step 316, control circuit 64 generates a control signal for actuator 36 by modifying the position command signal by a gain value or any other scheme. The resulting control signal compensates for the position error value and overcomes the threshold current value for the respective lower or raise valve being commanded. The control signal is adjusted at step 318 to compensate for changes in battery voltage or temperature from the values present when the control system was calibrated. The gain value is a permanent value input by the control circuit 64 from memory 208 prior to the lift operation. The gain value is a preset value based on temperature, oil temperature, oil bulk modulus, parameter variations due to tolerances and other parameters which effect the system response to the raise signal. At step 320, the corrected control signal is applied to actuator 36 to cause hitch assembly 38 to move elevationally at the desired rate.

Figure 4:
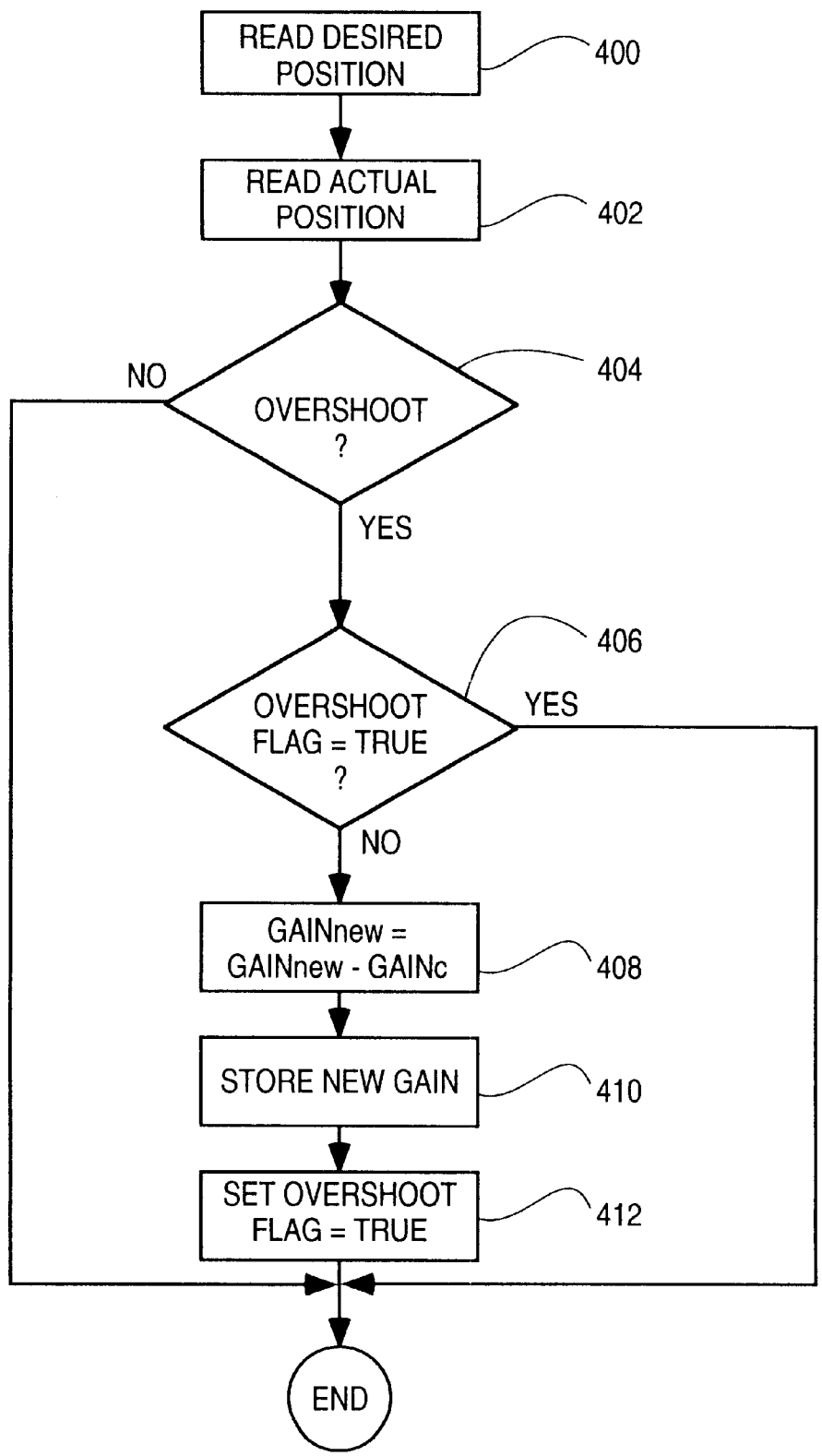
FIG. 4 is a flow chart generally representing the control logic used to modify and store the gain used to calculate the control signal.

Referring to FIG. 4, the gain applied to the control signal derived from the raise signal is modified using the following control routine. This routine is applied throughout the elevation operation. In step 400, the control circuit reads the desired position which is set by command device 66. During the lifting operation, the control circuit 64 periodically reads the position of the implement 44 from the position sensor 58 in step 402. The read operation in step 402 occurs every 10 milliseconds in the preferred embodiment but shorter or longer intervals may be used if desired. The control circuit 64 compares the position of the implement 44 with the position desired from command device 66 in step 404. The control circuit 64 will indicate an overshoot condition when the actual position read from position sensor 58 exceeds the desired position from command device 66 by a specified error value. This error value may, for example, be one percent of the desired position. In such a situation, an overshoot condition has occurred resulting in a jerking motion on the implement 44. If no overshoot condition is detected in step 404, the control circuit loops to the end of the routine.

If an overshoot condition is determined in step 404, the control circuit 64 will determine if the gain modification flag has been set on TRUE in step 406. Step 406 insures the gain modification only occurs once in a lifting operation. If the flag is determined to be TRUE, the controller 64 ends the routine. If the flag is not TRUE, the control circuit 64 resets the gain value by subtracting a constant from the present gain value in step 408. In step 410, the new gain value is stored in memory 208 and used to generate the control signal the next time the implement 44 is raised. The control circuit 64 then exits the routine.

In a preferred embodiment, control circuit 64 reads the original gain for the control signal being commanded from the memory location in which it is stored during the calibration sequence, and decrements the gain in steps of about 5% in the preferred embodiment each time step 404 is executed. The modified gain value will be used as long as the tractor is running with power to the control circuit 64. Alternatively, the control circuit 64 may measure the magnitude of the overshoot and scale the new gain in accordance with the magnitude of the overshoot to better adapt the new gain to eliminate the overshoot.

The old gain value is also kept in memory 208. Thus, if power to the system is switched off, the control circuit 64 will reload the old gain value from the memory 208 when power is restored and the system is reinitialized. The control circuit then resets the overshoot Flag to FALSE. Alternatively, if remote switches 124 or 126 are activated to release the implement 44, the control circuit will also reload the present gain value from memory 208 and reset the overshoot Flag to FALSE.

Figure 5:
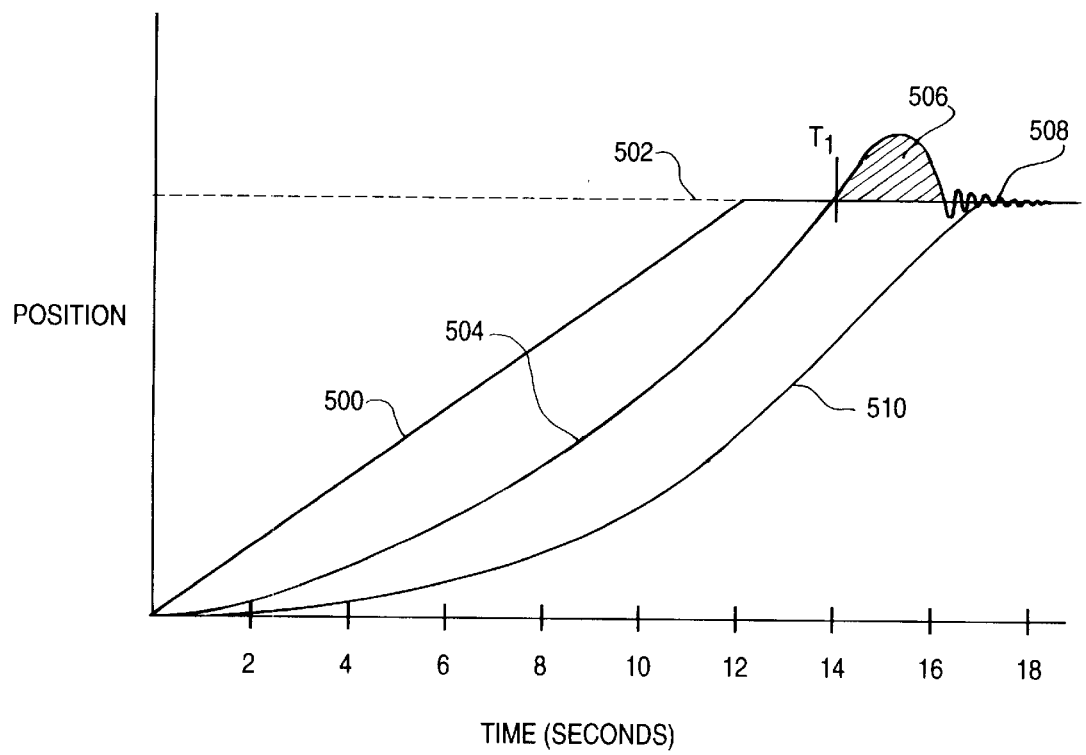
FIG. 5 is a graph generally representing the operation of the control system described herein which shows the resulting position signal from the modification of the gain value in response to undesirable implement movement.

The operation of control system 46 is discussed in relation to the graphs shown in FIG. 5. FIG. 5 shows the operation of control system 46 in modifying the gain of the control signal in response to an undesirable overshoot condition. A line 500 represents the position command line generated when an implement is commanded to elevate at a specified rate. In this example, implement 44 is commanded to elevate at a rate category of "1" corresponding to 12 seconds for full movement over the entire range of positions. A line 502 represents the eventual finishing position of implement 44 when the lift operation is completed.

The actual position of the implement 44 throughout the lift operation is shown by a line 504. The actual position of implement 44 shown as line 504 is less than that dictated by the command represented by line 500 during most of the lift operation due to the weight of the implement 44 and other factors which relate to the control signal. At time $T_1$ the actual position of the implement 44 becomes greater than the desired position as seen in area 506. The area 506 representing an overshoot condition is caused by a gain which is too high. The resulting control signal causes the implement 44 to overshoot the desired position represented by line 504. This overshoot condition causes a jerking motion as well as additional undesirable oscillations of the implement 44 shown by line 508.

Returning to FIG. 4, once the overshoot condition is detected in step 402, the gain is adjusted in step 408. The new gain is stored in memory 208 and applied by the control circuit 64 to the next lift operation. The control signal for a subsequent lift operation is shown as line 510. As may be seen, the actual position of the implement 44 during the subsequent lift operation is less than the desired position as indicated in line 500. However, the lower gain eliminates the overshoot condition. A number of iterations may be necessary to totally eliminate the overshoot condition, however, with each lift operation, the overshoot condition is diminished.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the various flow charts only generally represent the steps used by the control system. Different hardware and software implementations that fall within the scope of the appended claims would be apparent to a person of skill in the art.

What is claimed is:

1. A system for controlling a position of an implement coupled to a work vehicle, the implement being raised by a hydraulic positioning assembly comprising an actuator and a valve assembly configured to control fluid flow to and from the actuator in response to control signals, the system comprising:

a sensor configured to detect the position of the implement and to generate a signal representative thereof;

a position command device for setting a desired position of the implement; and a control circuit coupled to the sensor, the position command device, and the valve assembly, the control circuit configured to generate the control signals applied to the valve assembly to actuate the implement to the desired position, using a predetermined gain value and, after detecting undesirable movement of the implement, to modify the gain value to produce a modified gain value and generate subsequent control signals based upon the modified gain value; and a memory which stores the modified gain value, wherein the control circuit applies control signals using the modified said value to the valve assembly to actuate the implement to a subsequent desired position from the position command device.

2. The system of claim 1 wherein the actuator has a rate of movement and the control signals are pulse-width-modulated signals with a duty cycle and the rate of movement of the actuator is proportional to the duty cycle of the control signals.

3. The system of claim 1 wherein the control circuit determines undesirable movement by determining whether the sensed position of the implement exceeds the desired position of the implement by a specified value.

4. The system of claim 3 wherein the specified value is a percentage of the desired position.

5. The system of claim 3 wherein the control circuit modifies the predetermined gain value on subsequent actuation of the valve assembly until the position of the implement no longer exceeds that of the desired position by the specified value.

6. The system of claim 1 wherein the control circuit, after detecting undesirable implement movement, decreases the modified gain value by a percentage of the modified gain value.

7. The system of claim 1 wherein, when the control circuit, after detecting undesirable implement movement, decreases the predetermined gain value by a value which is a function of the undesirable implement movement.

8. A system for controlling the position of an implement coupled to a work vehicle, the implement being raised by a hydraulic positioning assembly comprising an actuator and a valve assembly configured to control fluid flow to and from the actuator in response to control signals, the system comprising:
    a sensor configured to detect the position of the implement and to generate a signal representative thereof;
    a position command device for setting a desired position of the implement; and
    a control circuit coupled to the sensor and the valve assembly, the control circuit configured to generate control signals based upon a desired rate of movement of the implement, the control signals applied to the valve assembly using a predetermined gain value and, after detecting undesirable movement of the implement, to modify the gain value to produce a modified gain value and generate subsequent control signals based upon the modified gain value.

9. The system of claim 8 further comprising an operator-adjustable rate of movement device configured to generate a signal representing the desired rate of movement.

10. A system for controlling the position of an implement coupled to a work vehicle, the implement being raised by a hydraulic positioning assembly comprising an actuator and a valve assembly configured to control fluid flow to and from the actuator in response to control signals, the system comprising:
    a sensor configured to detect the position of the implement and to generate a signal representative thereof;
    a position command device for setting a desired position of the implement; and
    a control circuit coupled to the sensor and the valve assembly, the control signals applied to the valve assembly using a predetermined gain value and, after detecting undesirable movement of the implement, to modify the gain value to produce a modified gain value and generate subsequent control signals based upon the modified gain value wherein the predetermined gain value is stored in a memory, and wherein the control circuit reloads the predetermined gain value when the implement is replaced.

11. A method for controlling the position of an implement coupled to a work vehicle, the implement being moveable by a hydraulic positioning assembly comprising an actuator and a valve assembly configured to control fluid flow to and from the actuator in response to control signals, comprising the steps of:
    (a) generating a control signal applied to the valve assembly based on a desired actuator position and a gain value, wherein the control signal includes a component representing a desired rate of movement of the actuator;
    (b) detecting undesirable implement movement;
    (c) modifying the gain value; and
    (d) using the modified gain value to generate subsequent control signals.

12. The method of claim 11 wherein the valve assembly comprises a raise valve and a lower valve, and the control signals include a raise control signal and a lower control signal applied to the raise valve and the lower valve, respectively.

13. The method of claim 11 wherein, in step (b), undesirable implement movement is detected by sensing a position signal; and determining when the sensed position signal exceeds the desired actuator position by a selected error value.

14. The method of claim 11 further comprising the step of storing the modified gain value.

15. The method of claim 11 further comprising the steps of:
    storing the gain value;
    replacing the implement with a second implement; and
    generating a control signal with the stored gain value.

16. A method for controlling the position of an implement coupled to a work vehicle, the implement being moveable by a hydraulic positioning assembly comprising an actuator and a valve assembly configured to control fluid flow to and from the actuator in response to control signals, comprising the steps of:
    (a) generating a control signal applied to the valve assembly based on a desired actuator position and a gain value;
    (b) detecting undesirable implement movement;
    (c) modifying the gain value by subtracting a selected constant value from the gain value to obtain a modified gain value; and
    (d) using the modified gain value to generate subsequent control signals.

17. The method of claim 16 wherein the constant value is a selected percentage of the gain value.

18. The method of claim 16 wherein the constant value is a function of the undesirable implement movement.

* * * * *